(12) United States Patent
Fischer

(10) Patent No.: US 8,540,789 B2
(45) Date of Patent: Sep. 24, 2013

(54) FILTER ELEMENT CONSTRUCTIONS

(75) Inventor: Niels Fischer, Wendeburg (DE)

(73) Assignee: Madison Filter 981 Limited, Industrial Estate, Haslingden, Lancashire (GB)

( * ) Notice: Subject to any disclaimer, the term of this patent is extended or adjusted under 35 U.S.C. 154(b) by 271 days.

(21) Appl. No.: 12/673,880

(22) PCT Filed: Aug. 22, 2008

(86) PCT No.: PCT/GB2008/002881
§ 371 (c)(1),
(2), (4) Date: Nov. 22, 2010

(87) PCT Pub. No.: WO2009/027657
PCT Pub. Date: Mar. 5, 2009

(65) Prior Publication Data
US 2011/0061353 A1    Mar. 17, 2011

(30) Foreign Application Priority Data

Aug. 25, 2007 (GB) .................................. 0716659.8

(51) Int. Cl.
*B01D 46/00* (2006.01)
(52) U.S. Cl.
USPC ..................... 55/378; 55/498; 55/502; 55/508
(58) Field of Classification Search
None
See application file for complete search history.

(56) References Cited

U.S. PATENT DOCUMENTS

| | | | |
|---|---|---|---|
| 4,104,170 A * | 8/1978 | Nedza | 210/487 |
| 4,878,930 A * | 11/1989 | Manniso et al. | 55/493 |
| 4,956,089 A * | 9/1990 | Hurst | 210/484 |
| 5,154,827 A * | 10/1992 | Ashelin et al. | 210/490 |
| 5,211,846 A * | 5/1993 | Kott et al. | 210/232 |
| 6,017,379 A | 1/2000 | Kauffman | |
| 6,103,119 A * | 8/2000 | Clements et al. | 210/493.1 |
| 6,179,131 B1 * | 1/2001 | Muzik et al. | 210/437 |
| 6,179,888 B1 * | 1/2001 | Mangiaforte | 55/341.1 |
| 6,375,698 B1 * | 4/2002 | Clements et al. | 55/341.1 |
| 6,447,567 B1 * | 9/2002 | Ehrenberg | 55/498 |
| 6,726,735 B1 | 4/2004 | Oussoren et al. | |
| 7,083,661 B2 * | 8/2006 | Hasegawa et al. | 55/498 |
| 7,186,284 B2 * | 3/2007 | Clements | 55/377 |
| 7,294,163 B1 * | 11/2007 | LaCroix | 55/498 |
| 2002/0162309 A1 * | 11/2002 | Schmitz et al. | 55/423 |
| 2004/0134851 A1 * | 7/2004 | Lucas et al. | 210/497.01 |
| 2005/0178097 A1 | 8/2005 | Clements | |
| 2007/0084170 A1 * | 4/2007 | Ehrenberg | 55/498 |

FOREIGN PATENT DOCUMENTS

FR            2407731           1/1979

* cited by examiner

*Primary Examiner* — Duane Smith
*Assistant Examiner* — Phillip Shao
(74) *Attorney, Agent, or Firm* — Barlow, Josephs & Holmes, Ltd.

(57) ABSTRACT

A filter element comprises a pleated filter (10), one end of which is received in an end cap (11), which is made up of a unitary molding comprising an end part (21) of a harder plastics material, and a lower part (22) of a softer plastics material, the plastics being compatible or of the same composition, differing only in hardness. A groove (24) engages with a support plate (14), the groove being formed in the softer material abutting the harder material so that the latter forms one face of the groove. A perforated support sleeve (29) can be inserted by dropping into the filter, and an end cap (12) at the other end of the filter either closes the end or is adapted for connection to a further similar filter.

21 Claims, 3 Drawing Sheets

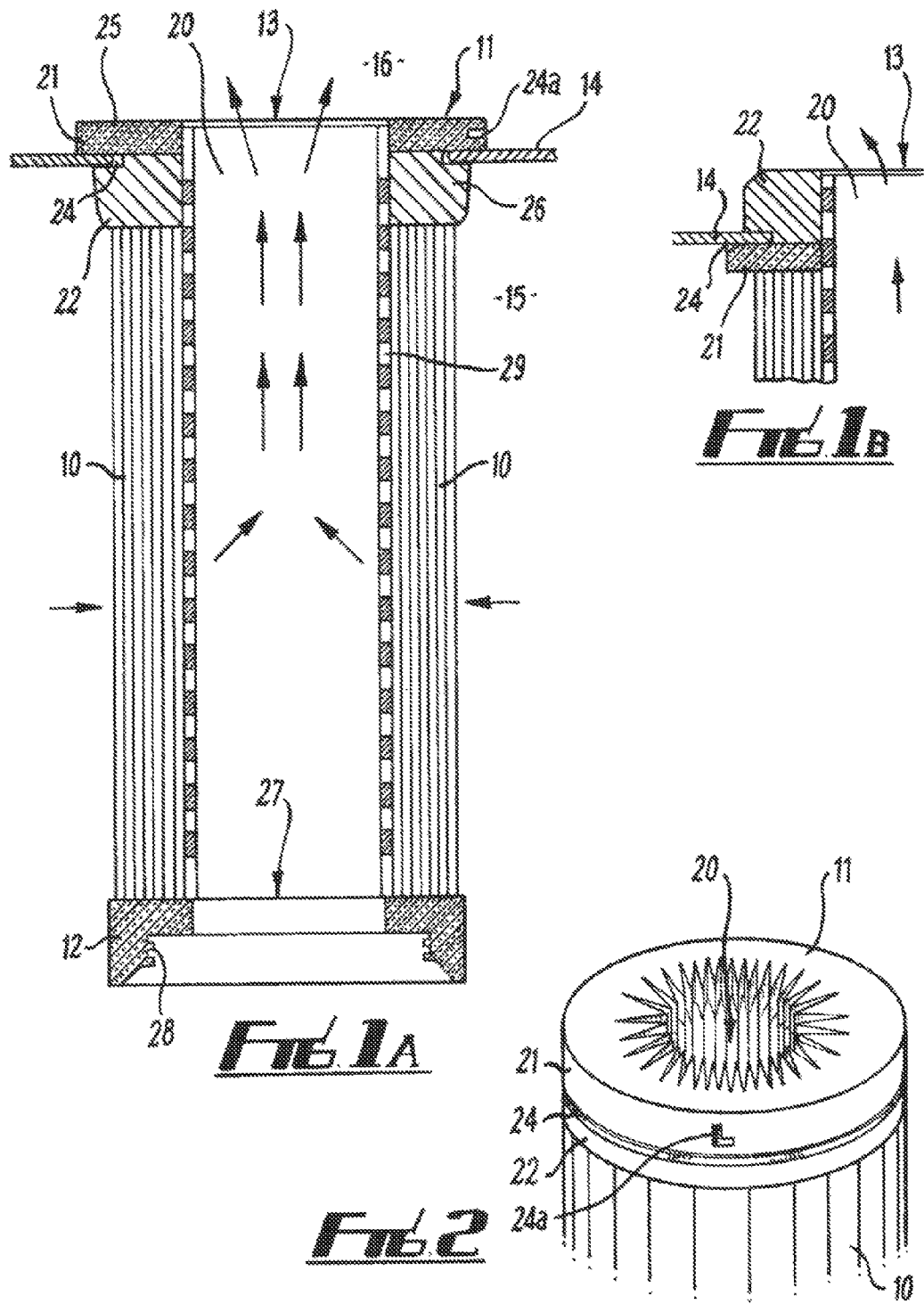

FILTER ELEMENT CONSTRUCTIONS

This invention relates to improvements in filter element constructions, and in particular to the construction of pleated filter elements.

Cylindrical pleated filter elements are used for example in gas filtration in conjunction with a support plate which separates a dirty gas plenum chamber from a clean gas plenum chamber, the support plate having an array of apertures in which the ends of the filter elements are received, so that the filter elements extend into the dirty gas chamber so that gas can pass into the filter from the dirty gas chamber, leaving entrained dust on the outer face of the filter cloth, and exit into the clean gas chamber.

It is important that the seal between the support plate and the filter elements is leak proof, to maintain separation of the dirty and clean gases. It is also highly desirable that the filter elements can be installed and removed from the support plate with the minimum amount of effort.

An object of the invention is to provide a sealing device which is inexpensive and easy to incorporate into the filter element and which permits simple installation into the support plate whilst giving a tight seal.

Prior art devices for fitting such filter elements into the apertures in support plates include the use of a profiled metal snap ring, e.g. as in WO98/36819. This ring is moulded within a rubber body. This has proved to be difficult to manufacture as the metal snap ring has to be located accurately within the rubber as it cures. During installation or removal the metal may be permanently deformed so that the rubber body loses its shape, and ceases to provide an effective seal of the filter to the support plate.

Alternatively, multi component ring systems have been proposed, as for example in U.S. Pat. No. 5,746,792, which are neither quick no easy to install. The structure shown in the patent includes a flanged end cap for the filter body, a collar about the end cap providing a lipped channel, and a metallic snap band which is itself a composite incorporating folded fabric strips within the snap band. The end of the filter is potted with resin between the end cap and the collar. The snap band is, as is usual, provided with a circumferential channel for engagement by the edge of the aperture in the support plate.

A further proposal comprises the use of soft rubber mouldings, which can be attached to the filter body, as in U.S. Pat. No. 5,632,791. These are pressed out against the support plate by an internal cage. The cage however adds extra weight to the filter element, and does not provide an effective seal as it is unable to exert outward pressure against the support plate effectively.

Other proposals include the use of hard plastics fittings with profiled grooves on the outside which deform and press-fit into the support plate, so that the support plate sits in the groove. The hard material again provides for a poor seal against any irregularities in the shape of the support plate, and it is difficult to unusually install and remove the filter elements without injury to staff, or damage to the filter media.

The invention provides a filter element comprising a filter body of pleated filter material, and an end cap adapted to provide dimensional stability to the filter body, and by a circumferential groove in the end cap, to engage with a support plate, characterised in that the end cap comprises a moulding consisting of plastics having a first higher and a second lower hardness, at least the groove being provided in a part having the lower hardness.

The end cap is preferably formed as a unitary body by moulding from two plastics compositions of identical or compatible composition apart from having different degrees of hardness.

The end cap may comprise an end part having the higher degree of hardness, and a lower part which includes the groove, of the lower degree of hardness.

The groove may be formed in the lower part immediately adjacent the harder end part, so that the upper wall of the groove is the harder material.

The upper end cap is advantageously provided with an inner edge which is formed with a profile matching the pleats of the filter medium, with a saw-toothed profile which produces a multi-rayed star shape or 'dandelion head' of V-shaped projections separated by U- or V-shaped indentations. This allows removal of the filter cartridge from the filter housing support plate, as it allows compression of the filter element skirt and filter material so that the cartridge may be removed by inserting a flat-bladed tool into the channel and levering against the upper flange.

A single flat-bladed tool may be used to prise or lever the element from the support plate to aid removal. The tool may be similar to a screwdriver or to a right-angled screwdriver, with an angled or L-sectioned blade.

One or more slots may be provided in the upper flange to aid insertion of the removal tool, for example three or four equally radically spaced slots.

The filter cartridge may include a rigid mesh cylindrical cage which can be inserted freely within the cartridge so that it can be dropped from the upper end. The cage would provide support to the filter material 10, so that the latter does not deform under gas flow.

The harder end part provides for structural rigidity and dimensional stability, whilst the softer material of the lower part is deformable so that the filter element can be pushed into or prised out from the support plate, and may be formed with a taper to assist this. The aperture in the support plate may be dimensioned to be smaller than the width of the lower part, so that the softer plastics material is maintained under compression to thereby provide a good seal.

A base moulding may be provided at the opposite end of the filter. This is preferably of the harder polymer composition used in the end cap. The base moulding, combined with the end cap serves to provide the pleated filter material sufficient dimensional stability. The base moulding may either be a cap on the filter element, which closes the end to ensure that gases only pass through the filter material radically from the outside to the inside, or may provide an axial opening and be adapted for connection to a further filter element, so that two or more filter elements may be fitted together end to end in a modular fashion to provide a filter structure of any desired length.

The polymer materials used to form the two-part end cap may be selected from a range of plastic or thermoplastic elastomers. These may be chosen or formulated according to the desired chemical and temperature resistance, which will be dictated by the chemical nature of the gases being filtered or of entrained particles, and the temperature in the environment of intended use. Preferably they comprise thermosetting polymers, such as polyurethane, which can be poured into a mould. Other possible materials include polyalkenes such as polyethylene and polypropylene, and polyesters, acrylonitrile butadiene styrene (ABS), epoxys or similar.

The mould preferably has the filter material located within it before the polymers are added to the mould, so that the cap is cast onto the filter material.

The element is preferably formed in an inverted position as compared with its intended orientation in use, so that the upper harder polymer is poured into the mould first and allowed to at least partially set, before the lower, softer polymer is poured on top. Once the polymers have set the moulding with the embedded filter material, is taken from the mould, and the base moulding is then formed at the opposite end of the filter element.

The harder and softer polymers are preferably of closely similar plastics, differing only in the amount or nature of the softeners or other additives required to achieve the different hardnesses. For example they may comprise polyurethanes based on the same isocyanate and polyol/polyether components. This will aid bonding or cross linking between the polymers so that they become effectively a single body.

A preferred embodiment of filter element construction according to the invention will now be described with reference to the accompanying drawings, wherein:—

FIG. 1A is a diagrammatic sectional view of as filter element construction according to the invention;

FIG. 1B is a fragmentary radial cross-section of a modified form of filter element construction according to the invention;

FIG. 2 is a perspective view of the upper end of the filter element construction of FIG. 1;

Figure 3:
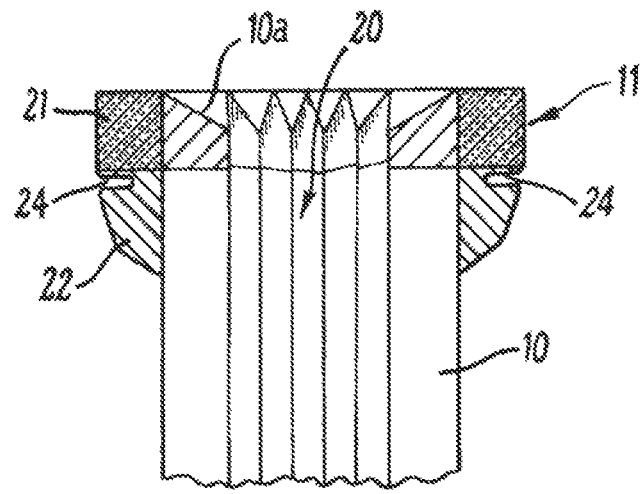
FIG. 3 is a cross-sectional view of the upper end of a modified design of filter according to the invention.

A filter element construction according to the invention, comprise a cylindrical pleated filter material 10, which may be referred to as a 'filter cloth', but the nature of which depends on the chemical and temperature environment in which it is to be used. The ends of the filter material 10 are received in a moulded upper end cap 11, and a base moulding 12, provided at opposite ends of the filter material to form a filter cartridge which can be fitted in an aperture 13 in a support plate 14, so as to extend downwardly therefrom. The cartridge is intended to be arranged to extend into a dirty gas plenum chamber 15 and have gas pass radially inward through the pleated filter material 10 into the filter element, and exit into a clean gas plenum chamber 16 through the aperture 13. It is not however excluded that the filter could be used with a reversed gas flow—i.e. radially outward but of course the recovery of retained solids for cleaning or retention is not so easy.

The upper end cap 11 is configured to provide a central aperture 20, an upper flange, 21 extending outwardly, and a lower skirt portion 22 the outer face of which is tapered to aid insertion into the aperture 13 on the support plate 14. The upper flange 21 and the lower skirt portion 22 are separated by groove or channel 24 which is adapted to receive the boundary edge of the aperture 13 of the support plate 14.

The upper end cap 11 is characterised by the fact that it comprises a two part moulding, comprising an upper part 25 of a harder plastics composition which forms the flange 21 and upper surface of the cap, and the upper wall of the groove 24, and a lower part 26 of a softer plastics composition which forms the skirt 22 and the inner end and lower wall of the groove 24.

The two parts 25 and 26 of the upper end cap are formed in of single moulding operation from compatible plastics to ensure that they are moulded together integrally without any zone of weakened bonding such as might result from joining two plastics mouldings by adhesive or welding, and give rise to cleavage or separation. Ideally, they are of identical plastics compositions, differing only in the amount or nature of softeners added to achieve the different degrees of hardness.

Plastics are preferred as they may be incinerated when discarded.

The parts are preferably of a polyurethane composition, each formed from the same isocyanate and polyol/polyether components.

The hardness of the harder part 25 lies in the range 70 Shore A, to 100 Shore A and of the softer part 26 in the range 15 Shore A to 50 Shore A, but other values may be adopted beyond these ranges.

The edge of the upper end cap 11, which defines the aperture 20, is formed with a saw toothed edge which follows the configuration of the pleated filter element 10. This forms multi-pointed star shaped or 'dandelion head' effect and provides an array of V-sectioned projections extending radially inwards, separated by V-sectioned indentations extending radially outwards. These latter may be u-sectioned (see FIGS. 5 and 6 and below). This is required to permit removal of the filter cartridge from the filter housing support plate, as it allows compression of the skirt portion 22 and of the filter material 10, so that the cartridge can be removed by inserting a flat bladed tool into the channel 24, and levering against the upper flange 21.

The flat-bladed tool may be similar to a screwdriver, but having an angled blade, which is e.g. L-sectioned, similar to that of a right-angled screwdriver.

To further aid removal, one or more slots 24A can be set into the upper flange 21 to aid insertion of the removal tool. These may comprise three or four such slots set at radially equally spaced locations. These are optional, and are not shown in connection with other embodiments described below.

The filter cartridge further includes a rigid mesh cylindrical cage 23 (FIG. 1) which is dimensional so as to be dropped down inside the cartridge from the top. The cage 29 provides support to the filter material 10, so that the latter does not deform under gas flow. Unlike typical filter cartridges, the cage 29 does not have any function in retention of the filter element 10. Thus the cage 29 is readily removable, and in fact must be removed to remove the cartridge from the filter housing support plate 14, since it is necessary to compress the filter element skirt 22 and filter element 10 on removal. The cage 29 is also reusable, and may be formed from a variety of metal or synthetic plastics materials which can be formed into a rigid yet open mesh structure.

The lower end of the pleated filter material 10 is received in a base moulding 12, which is of the harder material, used in part 25 of the upper end cap 11. The base moulding 12 bonds the end of the filter material 10, and provides an aperture 27, and is formed with a flared rim and a threaded part 28 which can attach by screwing to an oppositely formed part on the end of a further filter element, to build up an extended filter construction on a modular basis. As an alternative, the base moulding may be formed closed, or be closed by a screw-in plug, not shown.

The filter element of FIG. 1A is inserted into the dirty gas chamber 15 from above through the aperture in the support plate 14, and the harder plastics part 21 of the flange 11 is supported on the rim of the aperture. The softer plastics part 22 deforms to allow entry of the edges of the aperture to enter into the groove 24.

FIG. 1B shows a radial cross-section of a modified embodiment of the element which is adapted for insertion from below, i.e. from the dirty gas chamber 15, and this has the harder plastics part 21 below the support plate 14, and the support plastics part 22 above, so that the upper part will deform to allow the edges of the plastics to enter the groove 24.

The upper end of the pleated filter element 10 is moulded into or 'potted' in the moulding of the top end cap 11 and may as shown in the perspective view of FIG. 2 provide the inner surface of the end cap, so that the central aperture 20 is formed with a zigzag periphery matching the pleats of the filter material 10.

The base moulding 12 may be similarly configured, or may be moulded onto the lower end of the material 10 to provide a more conventional 'potted' structure.

FIG. 3 is a sectional view of the upper end region of a second embodiment of filter element construction according to the invention. This embodiment differs from the FIGS. 1 and 2 embodiment in that the slot 24 is wholly provided in the softer plastics part 22 of the end cap and that the upper end of the pleated filter element 10 is inclined downwardly and inwardly as at 10a to provide a tapered inlet for the filter cartridge. No slots 24A for removal using a tool are provided in these embodiments.

Figure 4:
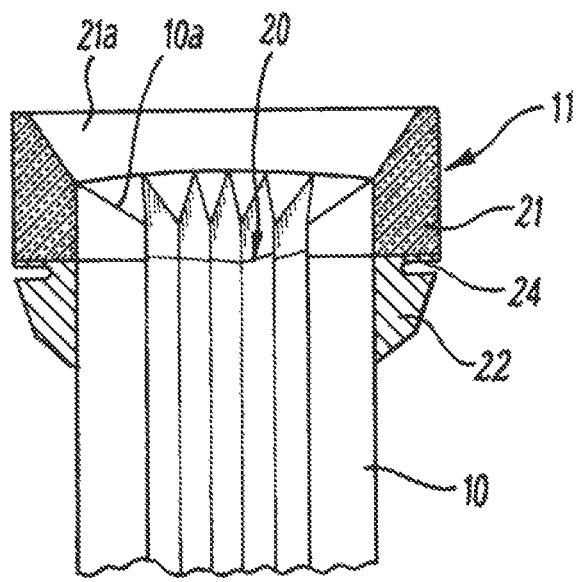
FIG. 4 is a cross-sectional view of the upper end of a second modified design of filter according to the invention.

In FIG. 4, additionally, the upper surface of the harder plastics part 21 of the end cap is also sloped as at 21a to provide a tapered frame, with a funnel shaped inlet end. The slopes of the filter element end 10a and of the end cap surface 21a may be different as shown, or aligned.

Figure 5:
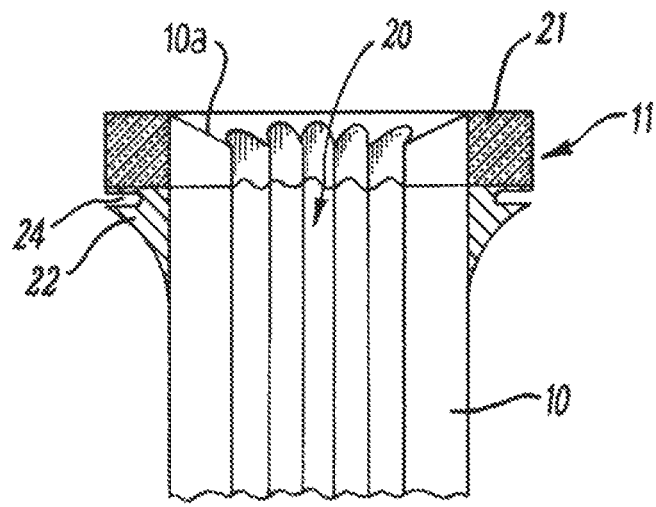
FIG. 5 is a cross-sectional view of the upper end of a third modified design of filter according to the invention.
Figure 6:
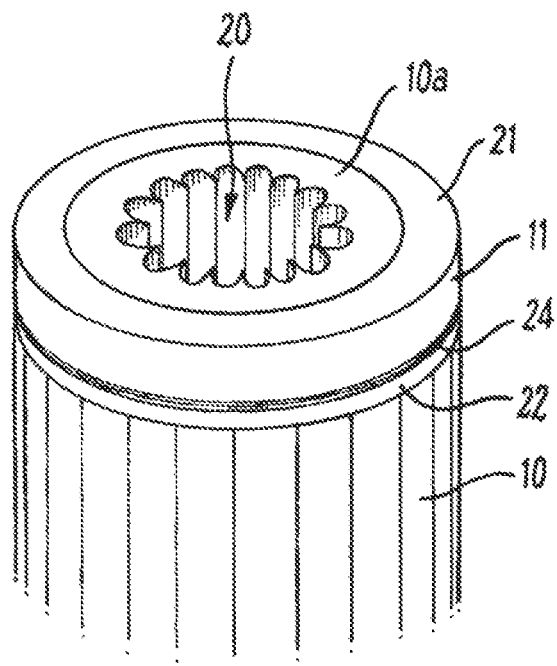
FIG. 6 is a plan view of the upper end of the filter of FIG. 5.

In FIGS. 5 and 6, the inlet end of the filter is again sloped at 10a, while the pleats of the filter element 10, instead of v-shaped have curved or radiused inner corners, producing U-shaped pleats. Also the lower face of the softer plastics part 22 of the end cap is provided with a concave radiused skirt, rather than the convex faced section shown in FIGS. 3 and 4.

Cleaning of the filter cartridge may be effected by mean of a reversed pulse of clean air from the interior out through the material 10.

The filter element construction according to the invention provides a dimensionally stable filter element, and is very simple to manufacture as it does not require multiple parts.

The filter element is suitable for installation and removal by hand, eased by use of a simple tool.

The use of homogenous polymers differing only in hardness to embed the filter means that the parts do not separate from each other, and by having the soft polymer in the groove, the moulding provides a good effective seal against the support plate regardless of defects or imperfections in the plate. The adjoining hard polymer ensures the soft polymer is not permanently deformed.

The filter construction is metal free and thus can be destroyed by incineration when it reaches the end of its life and is disposed of.

The invention claimed is:

1. A filter element, comprising:
a filter body of pleated filter material, and
an end cap adapted to provide dimensional stability to the filter body and to engage a circumferential edge of an aperture in a support plate within a radially outwardly facing circumferential groove in the end cap, the end cap comprising a unitary body formed by molding from two plastics compositions of compatible composition, wherein the end cap comprises a molding having a first part consisting of plastics having a first hardness, and a second part consisting of plastics having a second lower hardness, wherein the groove is provided in the second part having the lower hardness immediately adjacent the first part, such that an upper or lower all of the groove is of the harder material.

2. A filter element according to claim 1, wherein the first part of the end cap comprises an end part or flange having the first or higher hardness, and a skirt part of the second or lower hardness, said skirt part including the inner end and lower wall of the groove, the filter element thereby being adapted for insertion into the support plate.

3. A filter element according to claim 2, wherein the groove is formed in the skirt part immediately adjacent the harder end part or flange, so that a wall of the groove adjacent the end part or flange is of the harder material.

4. A filter element according to claim 3, wherein the end cap is provided with an inner edge which is formed with a saw-toothed profile matching the pleats of the filter medium.

5. A filter element according to claim 2, wherein one or more slots are provided in the upper flange to aid insertion of a removing tool.

6. A filter element according to claim 1, further comprising:
a rigid mesh cylindrical cage which can be inserted freely within the filter element, so that it can be dropped in from the upper end to act as a support for the filter material.

7. A filter element according to claim 1, wherein the width of the second part is of larger radius than the width of an aperture in a support plate in which it fits, so that the softer plastics material is maintained under compression to provide a good seal.

8. A filter element according to claim 1, further comprising:
a base molding is provided at the opposite end of the filter element, and is of the harder polymer hardness used in the end cap.

9. A filter element according to claim 8, herein the base molding comprises a cap on the respective end of the filter element which closes the end to ensure that gases only pass through the filter material radially from outside to inside, or vice versa.

10. A filter element according to claim 8, wherein the base molding provides an axial opening and is adapted for connection to a further filter element, so that two or more filter elements may be fitted together end to end in modular fashion to provide a filter structure of any desired length.

11. A filter element according to claim 1, wherein polymer materials used to form the end cap are selected from plastic or thermoplastic elastomers.

12. A filter element according to claim 1, wherein polymer materials used to form the end cap are selected from a group consisting of: thermosetting polymers, polyurethanes, and polyalkenes.

13. A filter element according to claim 12, wherein the polymer materials used to form the end cap are selected from a group consisting of: polyethylene and polypropylene, polyesters, acrylonitrile butadiene styrene (ABS), and epoxys.

14. A filter element according to claim 1, wherein the first part of the end cap comprises a skirt part of the first or higher hardness, and the second part of the end cap comprises an end part or flange having the second lower hardness, said flange including the inner end and lower wall of the groove, the filter element thereby being adapted for insertion into the support plate.

15. A filter element according to claim 14, wherein the groove is formed in the flange immediately adjacent the harder skirt part, so that a wall of the groove adjacent the skirt part is of the harder material.

16. A filter element comprising a filter body of pleated filter material, and an end cap adapted to provide dimensional stability to the filter body and to engage with a circumferential edge of an aperture in a support plate by means of a radially outwardly facing circumferential groove in the end cap, the end cap comprising a unitary body formed by molding from two plastics compositions of compatible composition, the end cap comprising a molding having a first part consisting of plastics having a first hardness, and a second part consisting of plastics having a second lower hardness, wherein the groove is provided wholly in the part having the lower hardness immediately adjacent the harder part.

17. A filter element according to claim 16 wherein the end cap comprises an end part or flange having the higher degree of hardness, and a lower part of the lower degree of hardness, said lower part including the groove, the filter element thereby being adapted for insertion into the support plate from above.

18. A filter element according to claim 16 wherein the end cap comprises an end part or upper flange having the lower degree of hardness and a lower part of the higher degree of hardness, the upper part including the groove, the filter element thereby being adapted for insertion into the support plate from below.

19. A filter element, comprising:
  a filter body of pleated filter material having an upper end, and
  an end cap at the upper end of said filter body, said end cap being adapted to provide dimensional stability to the filter body,
  said end cap comprising a unitary molded body formed by molding from two plastics compositions of compatible composition, said end cap having a first part consisting of plastics having a first hardness, and a second part consisting of plastics having a second lower hardness,
  said end cap including a radially outwardly facing circumferential groove provided in the second part having the lower hardness immediately adjacent the first part, such that an upper or lower wall of the groove is of the harder material,
  said radially outwardly facing grove being configured and arranged to engage a circumferential inner edge of an aperture in a filter support plate.

20. The filter element of claim 19 wherein the end cap comprises an upper flange part having the higher degree of hardness, and a lower skirt part of the lower degree of hardness, said lower skirt part including the groove, the filter element thereby being adapted for insertion into the aperture in the support plate from above.

21. The filter element of claim 19 wherein the end cap comprises an upper skirt part having the lower degree of hardness and a lower flange part of the higher degree of hardness, the upper skirt part including the groove, the filter element thereby being adapted for insertion into the aperture in the support plate from below.

* * * * *